(12) United States Patent
Okuda

(10) Patent No.: US 8,793,521 B2
(45) Date of Patent: Jul. 29, 2014

(54) IMAGE FORMING APPARATUS AND METHODS TO AVOID READ DISTURB ERRORS BY PROHIBITING A DEEP SLEEP STATE OF THE IMAGE APPARATUS UNTIL A RECOVERY PROCESS HAS IMPLEMENTED WHEN A READ COUNT OF A PROGRAM IN A NON-VOLATILE MEMORY REACHES A THRESHOLD

(75) Inventor: Masaya Okuda, Osaka (JP)

(73) Assignee: KYOCERA Document Solutions Inc. (JP)

( * ) Notice: Subject to any disclaimer, the term of this patent is extended or adjusted under 35 U.S.C. 154(b) by 549 days.

(21) Appl. No.: 13/114,785

(22) Filed: May 24, 2011

(65) Prior Publication Data
US 2011/0296219 A1 Dec. 1, 2011

(30) Foreign Application Priority Data

| May 28, 2010 | (JP) | 2010-122930 |
| Oct. 28, 2010 | (JP) | 2010-242015 |
| Jan. 13, 2011 | (JP) | 2011-004637 |
| Feb. 2, 2011 | (JP) | 2011-021199 |
| Apr. 6, 2011 | (JP) | 2011-084530 |

(51) Int. Cl.
| G06F 1/00 | (2006.01) |
| G06F 1/26 | (2006.01) |
| G06F 3/12 | (2006.01) |
| G03G 15/00 | (2006.01) |
| G06F 1/32 | (2006.01) |

(52) U.S. Cl.
CPC .......... *G03G 15/5004* (2013.01); *G06F 1/3287* (2013.01); *G06F 1/3284* (2013.01); *Y02B 60/1267* (2013.01)

USPC ........................... 713/323; 713/320; 358/1.15

(58) Field of Classification Search
CPC ................ G06F 1/00; G06F 1/26; G06F 3/12
USPC .................................. 713/320, 323; 358/1.15
See application file for complete search history.

(56) References Cited

U.S. PATENT DOCUMENTS

| 2005/0007628 A1* | 1/2005 | Yamano et al. ............... 358/1.15 |
| 2005/0021728 A1* | 1/2005 | Sugimoto ..................... 709/223 |

(Continued)

FOREIGN PATENT DOCUMENTS

| EP | 0657846 | 6/1995 |

(Continued)

*Primary Examiner* — Thomas Lee
*Assistant Examiner* — Terrell Johnson
(74) *Attorney, Agent, or Firm* — McDonnell Boehnen Hulbert & Berghoff LLP

(57) ABSTRACT

An image forming apparatus includes a communication interface receiving data; a buffer storing the data; a main system processing the stored data; a subsystem controlled by the main system to perform a function of the image forming apparatus; a system control unit; and a data processing unit. The system control unit switches an operation status mode of the image forming apparatus between a normal status mode and a deep sleep status mode. When the image forming apparatus is in the deep sleep status mode, the data processing unit processes the data received from the buffer if the data is determined to be processable by the data processing unit and causes the system control unit to switch the operation status mode from the deep sleep status mode to the normal status mode if the received data is determined not to be processable by the data processing unit.

11 Claims, 7 Drawing Sheets

(56) References Cited

U.S. PATENT DOCUMENTS

| | | |
|---|---|---|
| 2005/0128515 A1 | 6/2005 | Ohno |
| 2007/0260337 A1* | 11/2007 | Sugiyama ............... 700/40 |
| 2009/0282278 A1 | 11/2009 | Satoh |
| 2010/0257394 A1* | 10/2010 | Koga ..................... 713/324 |
| 2011/0019225 A1* | 1/2011 | Jung ...................... 358/1.15 |

FOREIGN PATENT DOCUMENTS

| | | |
|---|---|---|
| EP | 1136907 | 9/2001 |
| JP | 08-101606 | 4/1996 |
| JP | 2001-084116 | 3/2001 |
| JP | 2001-290791 | 10/2001 |
| JP | 2002-185549 | 6/2002 |
| JP | 2004-005029 | 1/2004 |
| JP | 2005-196741 A | 7/2005 |
| JP | 2005-267539 A | 9/2005 |
| JP | 2008-287492 | 11/2008 |
| JP | 2009-294927 A | 12/2009 |

* cited by examiner

IMAGE FORMING APPARATUS AND METHODS TO AVOID READ DISTURB ERRORS BY PROHIBITING A DEEP SLEEP STATE OF THE IMAGE APPARATUS UNTIL A RECOVERY PROCESS HAS IMPLEMENTED WHEN A READ COUNT OF A PROGRAM IN A NON-VOLATILE MEMORY REACHES A THRESHOLD

INCORPORATION BY REFERENCE

This application is based upon and claims the benefit of priority from corresponding Japanese Patent Application Nos. 2010-122930 filed May 28, 2010, 2010-242015 filed Oct. 28, 2010, 2011-004637 filed Jan. 13, 2011, 2011-021199 filed Feb. 2, 2011, and 2011-084530 filed Apr. 6, 2011, the entire contents of which is incorporated herein by reference.

BACKGROUND

1. Field of the Invention

The present invention relates to an image forming apparatus and an image forming method having a power saving mode.

2. Description of the Related Art

Some typical image forming apparatuses, such as printers, copiers, and multifunction peripherals (MFP), have a power saving mode (sleep status mode).

The typical image forming apparatus decreases the reception speed of data upon receiving the data in the sleep status mode, and then starts a reception process of the data with the start of an initialization process for returning to a normal status mode. The typical image forming apparatus returns the reception speed to the original speed when the initialization process is completed.

The typical image forming apparatus returns to the normal status mode after moving to the sleep status mode since the initialization process is performed each time the data is received while in the sleep status mode. Therefore, this results in low power saving.

Another image forming apparatus includes an energy saving subsystem having a power consumption that is smaller than that of a main system. To move to the sleep status mode, this other image forming apparatus supplies power to the energy saving subsystem and stops supply of the power to the main system and subsystems (including a print engine, a scanner, and a display panel that are controlled by the main system). The energy saving subsystem in this other image forming apparatus controls the supply of the power to the main system and the subsystems. This other image forming apparatus is better able to suppress power consumption because the power is supplied only to the energy saving subsystem while in the sleep status mode.

However, the energy saving subsystem in this other image forming apparatus supplies power to start the main system upon receiving the data from a host apparatus if this other image forming apparatus is in the sleep status mode. The main system processes the data received from the host apparatus regardless of the kind of the data.

Accordingly, the speed to process the data in the sleep status mode in this other image forming apparatus is much lower than the speed to process the data in the normal status mode by an amount of the time period during which the main system is started.

Meanwhile, the typical image forming apparatus includes a processor and is operated by controlling a program. Specifically, the image forming apparatus includes a non-volatile memory, such as a NAND flash memory, and reads out a controller program stored in the non-volatile memory to execute the read out controller program using the processor.

In the typical image forming apparatus, the controller program is read out from the NAND flash memory to be executed after returning from the sleep status mode in which the processor in the controller is turned off.

Accordingly, if switching between the sleep state mode and the normal status mode frequently occurs, a read disturb error may possibly occur in the controller program.

SUMMARY

The present disclosure relates to an image forming apparatus and an image forming method that may have a higher degree of power saving and that may avoid read disturb errors even when frequently switching between a sleep status mode and a normal status mode.

An image forming apparatus according to one aspect of the present disclosure includes: a communication interface configured to receive data; a buffer configured to store the data received by the communication interface; a main system configured to process the data stored in the buffer; a subsystem configured to be controlled by the main system to perform a function of the image forming apparatus; a system control unit; and a data processing unit. The system control unit is configured to switch an operation status mode of the image forming apparatus between a normal status mode in which the main system and the subsystem are turned on and a deep sleep status mode in which the main system and the subsystem are turned off. The data processing unit is configured to, when the operation status mode is the deep sleep status mode, process the data received from the buffer if the data is determined to be processable by the data processing unit, and cause the system control unit to switch the operation status mode from the deep sleep status mode to the normal status mode if the data received from the buffer is determined not to be processable by the data processing unit.

An image forming method according to one aspect of the present disclosure includes: via a communication interface, receiving data; via a buffer, storing the data received by the communication interface; via a main system, processing the data stored in the buffer; via a subsystem, being controlled by the main system to perform a function of an image forming apparatus; via a system control unit, switching an operation status mode of the image forming apparatus between a normal status mode in which the main system and the subsystem are turned on and a deep sleep status mode in which the main system and the subsystem are turned off; and via a data processing unit, when the operation status mode is the deep sleep status, processing data received from the buffer if the data is determined to be processable by the data processing unit, and causing the system control unit to switch the operation status mode from the deep sleep status mode to the normal status mode if the data received from the buffer is determined not to be processable by the data processing unit.

Additional features and advantages are described herein, and will be apparent from the following Detailed Description and the figures.

DETAILED DESCRIPTION

First Embodiment

Figure 1:
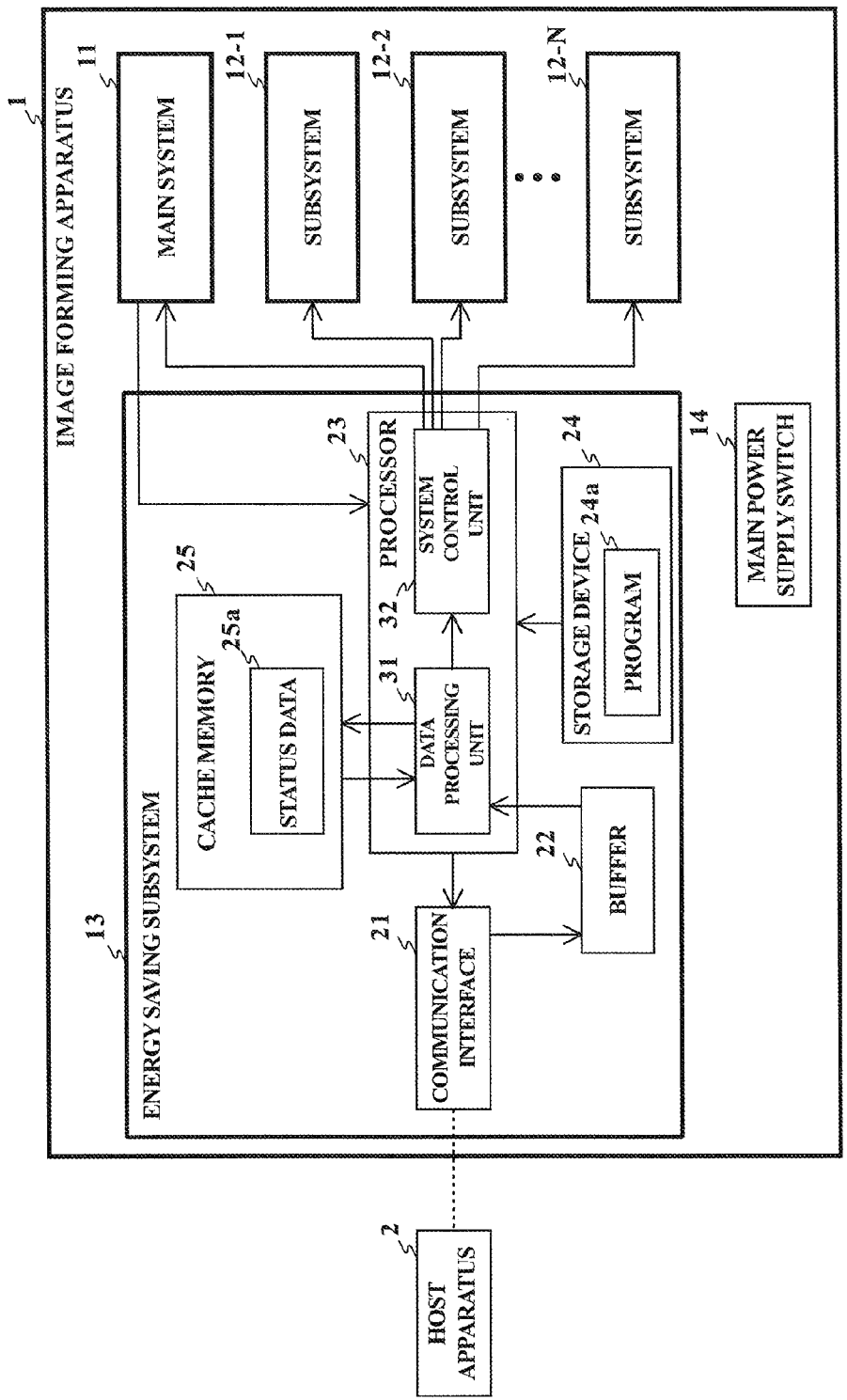
FIG. 1 shows a block diagram illustrating an example of a configuration of an image forming apparatus according to an embodiment of the present disclosure.

FIG. 1 shows a block diagram showing an example of a configuration of an image forming apparatus according to an embodiment of the present disclosure. An image forming apparatus 1 includes, for example, a printer or a multifunction peripheral (MFP). A host apparatus 2, such as a personal computer, is connected to the image forming apparatus 1. The image forming apparatus 1 receives data from the host apparatus 2 and processes the received data.

The image forming apparatus 1 includes a main system 11, one or more subsystems 12-1 to 12-N, and an energy saving subsystem 13.

The main system 11 controls the subsystems to perform various processes. The subsystems 12-1 to 12-N perform a function (for example, a printer function, a scanner function, a facsimile communication function, a user interface function of an operation panel) of the image forming apparatus 1. The energy saving subsystem 13 receives data from the host apparatus 2 and switches operation status modes of the main system 11 and at least one of the subsystems 12-1 to 12-N.

The main system 11, at least one of the subsystems 12-1 to 12-N, and the energy saving subsystem 13 may be each installed as an independent hardware (for example, a circuit board) and may be independently turned on or off. The image forming apparatus 1 (the main system 11 and the subsystems 12-1 to 12-N) is in at least one of the operation status modes: a normal status mode, a light sleep status mode, and a deep sleep status mode. In the normal status mode, the main system 11, at least one of the subsystems 12-1 to 12-N, and the energy saving subsystem 13 are operating. In the light sleep status mode, the main system 11 and the energy saving subsystem 13 are operating and the subsystems 12-1 to 12-N are turned off. In the deep sleep status mode, the energy saving subsystem 13 is operating and the main system 11 and the subsystems 12-1 to 12-N are turned off.

Switching from the normal status mode to the light sleep status mode or the deep sleep status mode and switching from the light sleep status mode to the normal status mode are determined by the main system 11. Switching from the deep sleep status mode to the normal status mode is determined by the energy saving subsystem 13. Since an amount of power consumed in the deep sleep status mode is smaller than that in the light sleep status mode, a higher power saving is achieved in the deep sleep status mode. However, since the time required to move from the deep sleep status mode to the normal status mode is longer than the time required to move from the light sleep status mode to the normal status mode, the processing of data that is received from the host apparatus 2 is delayed. Accordingly, when, for example, a facsimile (FAX) board is mounted in the image forming apparatus 1 or a universal serial bus (USB) device such as a USB memory or a network cable is connected to the image forming apparatus 1, the operation status mode of the image forming apparatus 1 may be set so as to be switched from the normal status mode to the light sleep status mode, instead of the deep sleep status mode, corresponding to a request from a user.

The energy saving subsystem 13 includes a communication interface 21, a buffer 22, a processor 23, a storage device 24, and a cache memory 25.

The communication interface 21 is an interface circuit that receives the data from the host apparatus 2. The buffer 22 is a device, such as a memory, temporarily storing the data received via the communication interface 21. The data received via the communication interface 21 are sequentially stored in the buffer 22 and are deleted from the buffer 22 after they are processed.

In the normal status mode and the light sleep status mode, the data stored in the buffer 22 is processed by the main system 11. In the deep sleep status mode, the data stored in the buffer 22 is processed by a data processing unit 31 in the processor 23 if the data is determined to be processable by the data processing unit 31.

The processor 23 may be a computer including a central processing unit (CPU), a read only memory (ROM), a random access memory (RAM), and the like. The processor 23 loads a program from the storage device 24 or the ROM into the RAM and executes the program in the CPU to implement the various processing units. The storage device 24 may be a non-volatile storage device, such as a hard disk drive or a flash memory, and a program 24a that is executed by the processor 23 is stored in the storage device 24. The program 24a may be recorded in a removable storage medium, and the removable storage medium and a drive unit that reads out the program 24a from the removable storage medium may be used as the storage device 24.

After the image forming apparatus 1 is started, the program 24a is executed by the processor 23. Execution of the program 24a by the processor 23 implements the processing units including the data processing unit 31 and a system control unit 32, and the like.

When the main system 11 is in the deep sleep status mode, the data processing unit 31 processes data received from the buffer 22 if the data is determined to be processable by the data processing unit 31, and causes the system control unit 32 to switch the operation status mode of the main system 11 from the deep sleep status mode to the normal status mode if the data received from the buffer 22 is determined not to be processable by the data processing unit 31.

The system control unit 32 switches the status of the main system 11 and the subsystems 12-1 to 12-N between the normal status mode and the deep sleep status mode.

The cache memory 25 may be a memory, such as a RAM. When the operation status mode of the main system 11 is switched from the normal status mode to the deep sleep status mode, the data processing unit 31 collects the internal status of the image forming apparatus 1 (for example, the operation status mode of the image forming apparatus 1, the status indicating whether an option is included in the image forming apparatus 1, and/or version information about software installed in the image forming apparatus 1) from the main system 11 and/or the subsystems 12-1 to 12-N and stores the internal status of the image forming apparatus 1 in the cache memory 25 as status data 25a. The data processing unit 31 determines whether the data is processable by the data processing unit 31 on the basis of the status data 25a.

If operation of at least one of the main system 11 and the subsystems 12-1 to 12-N and/or acquisition of status information from at least one of the main system 11 and the subsystems 12-1 to 12-N is necessary for processing the received data, the data processing unit 31 determines that the received data is not processable by the data processing unit 31.

For example, print data, a command to read and/or write data in the subsystem 12-i, and a processing command to the subsystem 12-i may be determined not to be processable by the data processing unit 31.

For example, an Address Resolution Protocol (ARP) request, a Post Office Protocol version 3 (POP3) response, and a command to request the status of the image forming apparatus 1 may be determined to be processable by the data processing unit 31. The ARP request is data that requests a Media Access Control (MAC) address of the image forming apparatus 1 and that is received from the host apparatus 2. The POP3 response is data that is received from the host apparatus 2 as a response to a POP3 request that has been transmitted to a mail server serving as the host apparatus 2 from the energy saving subsystem 13 to confirm an e-mail. The command to request the status of the image forming apparatus 1 is data that requests the status, such as the operation status mode or paper jam, of the image forming apparatus 1 and that is received from the host apparatus 2.

The data processing unit 31 controls the communication interface 21 to decrease the speed at which data is stored into the buffer 22 from the communication interface 21 when the data processing unit 31 causes the system control unit 32 to switch the operation status mode of the main system 11 from the deep sleep status mode to the normal status mode, and returns the speed to original speed when switching of the operation status mode is completed.

A main power supply switch 14 is used to turn on or off the supply of power to internal devices, such as the main system 11, the subsystems 12-1 to 12-N, and the energy saving subsystem 13, in the image forming apparatus 1. If the main power supply switch 14 is switched from an OFF state to an ON state, the image forming apparatus 1 is started. If the main power supply switch 14 is switched from the ON state to the OFF state, the image forming apparatus 1 is shut down.

In the image forming apparatus 1, in the normal status mode, when the main system 11 receives the data from the host apparatus 2, the main system 11 reads out the data from the buffer 22, processes the data, and performs a process specified by the data in the main system 11 or the subsystem 12-i.

If a condition to switch to the deep sleep status mode is satisfied in the normal status mode, the main system 11 transmits a request to switch to the deep sleep status mode to the energy saving subsystem 13. The data processing unit 31 in the energy saving subsystem 13 updates the status data 25a when the data processing unit 31 receives the request, and causes the system control unit 32 to turn off the main system 11 and the subsystems 12-1 to 12-N. This results in the deep sleep status mode.

In the deep sleep status mode, the energy saving subsystem 13 continues to operate and, if the data is transmitted from the host apparatus 2, the communication interface 21 receives the data and writes the data into the buffer 22.

The data processing unit 31 in the energy saving subsystem 13 determines whether the data is processable in the data processing unit 31 or whether the main system 11 and the subsystems 12-1 to 12-N are switched to the normal status mode corresponding to the data written into the buffer 22.

Figure 2:
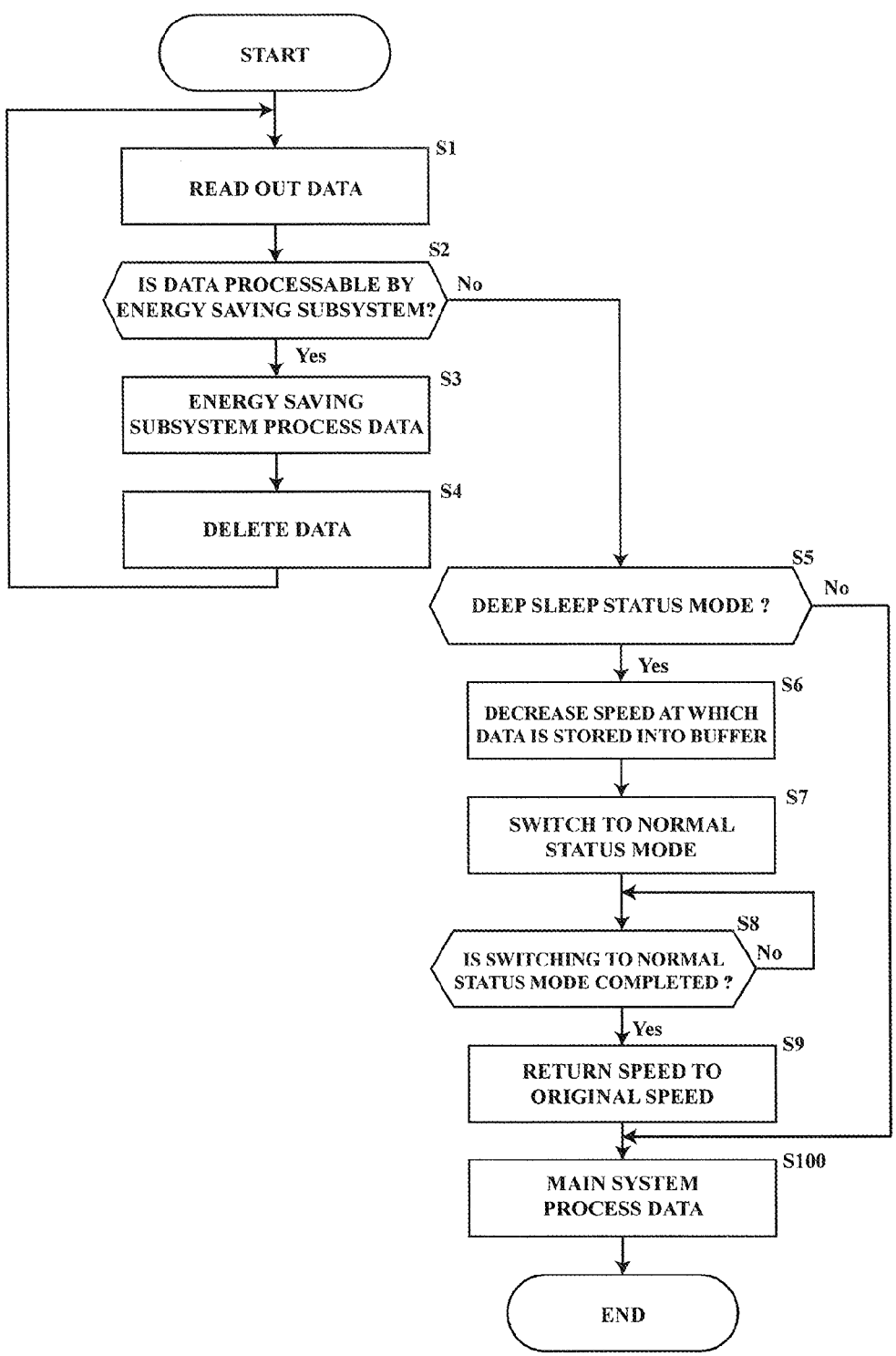
FIG. 2 shows a flowchart illustrating an exemplary operation of a data processing unit in the image forming apparatus.

FIG. 2 shows a flowchart illustrating an exemplary operation of the data processing unit 31 in the image forming apparatus 1.

In Step S1, the data processing unit 31 reads out the received data from the buffer 22 in a First-In First-Out (FIFO) order.

In Step S2, the data processing unit 31 determines whether the read out data is processable by the energy saving subsystem 13 (that is, by the data processing unit 31).

If the data processing unit 31 determines that the read out data is processable by the energy saving subsystem 13 (Yes in Step S2), in Step S3, the data processing unit 31 processes the data. After the processing is completed, in Step S4, the data processing unit 31 deletes the data from the buffer 22. Then, the step returns to Step S1.

If the data processing unit 31 determines that the read out data is not processable by the energy saving subsystem 13 (No in Step S2), in Step S5, the data processing unit 31 determines whether the current operation status mode of the image forming apparatus 1 is the deep sleep status mode. If the data processing unit 31 determines that the current operation status mode of the image forming apparatus 1 is not the deep sleep status mode (No in Step S5), in Step S100, the data is not processed by the data processing unit 31 and is processed by the main system 11.

If the data processing unit 31 determines that the current operation status mode of the image forming apparatus 1 is the deep sleep status mode (Yes in Step S5), in Step S6, the data processing unit 31 controls the communication interface 21 to decrease the speed at which the data is stored into the buffer 22 to a specified speed. In Step S7, the data processing unit 31 causes the system control unit 32 to turn on the main system 11 and the subsystems 12-1 to 12-N to switch to the normal status mode. By reducing the size of data stored into the buffer 22 in one data storage operation, the speed at which the data is stored into the buffer 22 may be decreased.

In Step S8, the data processing unit 31 determines whether switching to the normal status mode is completed. If the data processing unit 31 determines that switching to the normal status mode is completed (Yes in Step S8), in Step S9, the data processing unit 31 controls the communication interface 21 to return the speed at which the data is stored into the buffer 22 to the original speed. If the data processing unit 31 determines that switching to the normal status mode is not completed (No in Step S8), the step returns to Step S8.

After the operation status mode is switched to the normal status mode, in Step S100, the main system 11 reads out and processes the received data stored in the buffer 22. When the processing is completed, the data processing unit 31 deletes the processed data from the buffer 22.

According to the first embodiment, when the main system 11 is in the deep sleep status mode, the data processing unit 31 in the energy saving subsystem 13 processes data received from the buffer 22 if the data is determined to be processable by the data processing unit 31, and causes the system control unit 32 to switch the operation status mode of the main system 11 from the deep sleep status mode to the normal status mode if the data received from the buffer 22 is determined not to be processable by the data processing unit 31.

Accordingly, since the main system 11 is not returned to the normal status mode if the received data is processable by the data processing unit 31, the frequency at which the operation status mode of the main system 11 is switched from the deep sleep status mode to the normal status mode is decreased. This results in increasing the degree of power saving of the image forming apparatus 1.

The present disclosure of the first embodiment includes various other embodiments. For example, other designs may be used in which the above-described components are each performed.

For example, although the operation status mode in which the main system 11 is operating is classified into the normal status mode and the light sleep status mode in the first embodiment, the operation status mode in which the main system 11 is operating may be only classified into the normal status mode.

Second Embodiment

Figure 3:
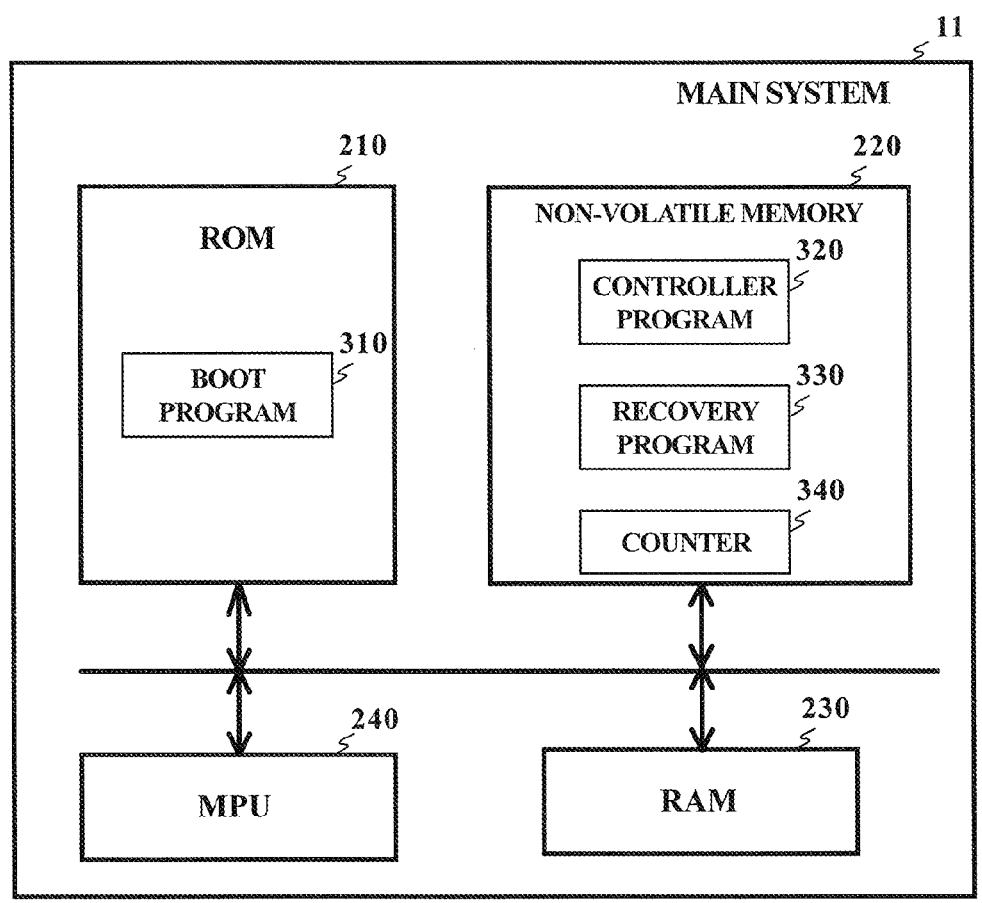
FIG. 3 shows a block diagram illustrating an example of a configuration of a main system in the image forming apparatus.

FIG. 3 shows a block diagram illustrating an example of the configuration of the main system 11 in the image forming apparatus 1. The main system 11 includes a ROM 210, a non-volatile memory 220, a RAM 230, and a micro processor unit (MPU) 240.

The ROM 210 is a non-rewritable non-volatile memory. A boot program 310 may be stored in the ROM 210 in the second embodiment. The boot program 310 is executed by the MPU 240 to boot a controller program 320 when the main system 11 is started (that is, the main system 11 is turned on).

The non-volatile memory 220 is a rewritable non-volatile memory, such as a NAND flash memory, in which a read disturb error may possibly occur. The controller program 320, a recovery program 330, and a counter 340 may be stored in the non-volatile memory 220 in the second embodiment.

The controller program 320 is used to control the subsystems 12-1 to 12-N and to perform the internal processing in the main system 11.

The controller program 320 is used to switch the operation status mode of the image forming apparatus 1 from the deep sleep status mode to the light sleep status mode if the number of times when the controller program 320 is read out from the non-volatile memory 220, i.e., a read count, reaches a specified threshold value. This threshold value is upper limit of the read count at which the read disturb error does not occur in the non-volatile memory 220.

When the read count is lower than the threshold value, the operation status mode of the image forming apparatus 1 is switched to the deep sleep status mode if a first status switching condition is satisfied and the operation status mode is switched to the light sleep status mode if a second status switching condition is satisfied. However, when the read count is higher than or equal to the threshold value, the operation status mode is switched to the light sleep status mode even if the first status switching condition is satisfied.

The recovery program 330 is used to recover (refresh) a storage area of the controller program 320. If the read count reaches the threshold value, a process to recover the storage area of the controller program 320 in the non-volatile memory 220 is executed according to the recovery program 330, when the main power supply switch 14 (illustrated in FIG. 1) in the image forming apparatus 1 is switched off by the user and, then, the main power supply switch 14 is switched on to start the image forming apparatus 1.

The counter 340 is data indicating the read count of the controller program 320.

The RAM 230 is a volatile memory in which programs, such as the controller program 320 and the like, are loaded and/or in which data processed in the process performed by the MPU 240 is temporarily stored.

The MPU 240 is a processor that executes various programs including the boot program 310, the controller program 320, and the recovery program 330.

The ROM 210, the non-volatile memory 220, the RAM 230, and the MPU 240 are connected to each other via a bus and/or a controller chip to exchange the data among them.

(1) Operation at Startup

Figure 4:
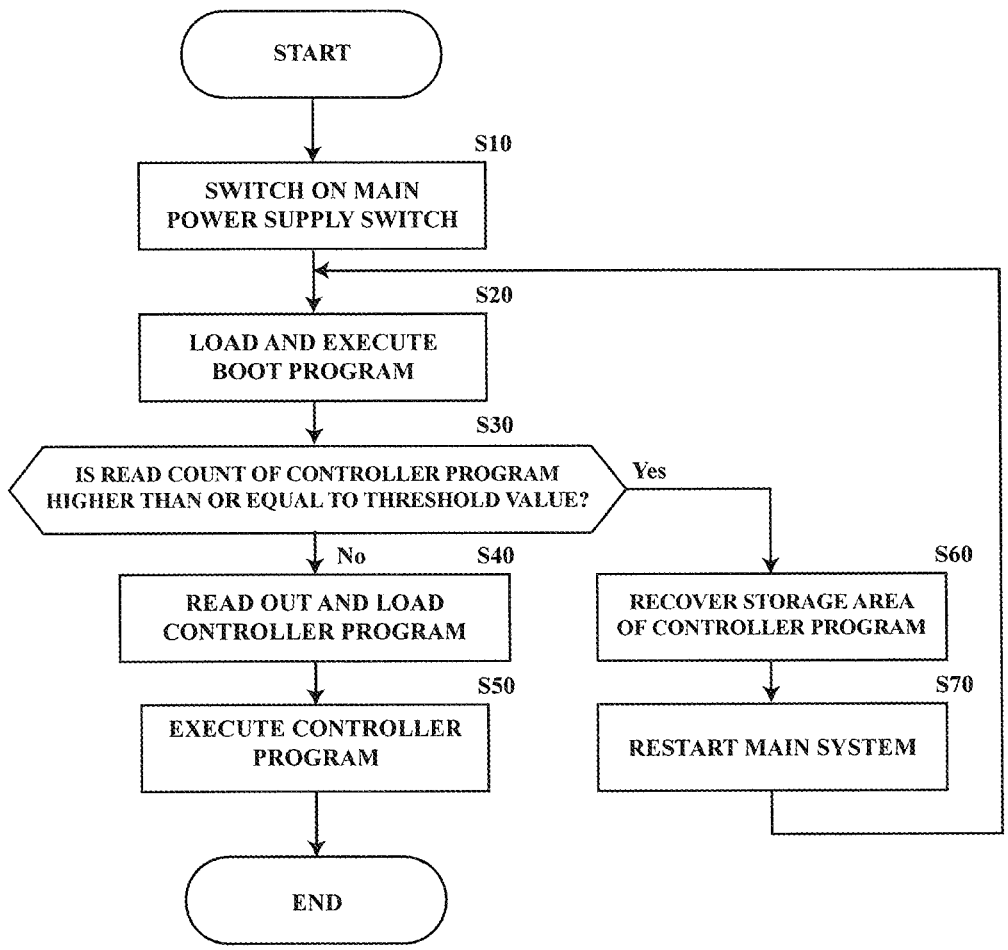
FIG. 4 shows a flowchart illustrating an exemplary operation at startup in the image forming apparatus.

FIG. 4 is a flowchart illustrating an exemplary operation at startup in the image forming apparatus 1.

When the main power supply switch 14 is switched off, no power is supplied to the image forming apparatus 1. In Step S10, the user switches on the main power supply switch 14 to start the supply of power to the image forming apparatus 1. In Step S20, the MPU 240 in main system 11 loads the boot program 310 to execute the boot program 310.

In Step S30, the MPU 240 reads out the counter 340 according to the boot program 310 or another program booted by the boot program 310 to determine whether the read count of the controller program 320 is higher than or equal to the threshold value.

If the read count of the controller program 320 is not higher than or equal to the threshold value (No in Step S30), in Step S40, the MPU 240 reads out the controller program 320 from the non-volatile memory 220 according to the boot program 310 and loads the read out controller program 320 in the RAM 230. In Step S50, the MPU 240 executes the controller program 320. At this time, the MPU 240 increments a value of the counter 340 by one in according to the controller program 320 or the boot program 310.

If the read count of the controller program 320 is higher than or equal to the threshold value (Yes in Step S30), in Step S60, the MPU 240 reads out the recovery program 330 and loads the read out recovery program 330 in the RAM 230 to execute the recovery program 330. This results in recovering the storage area of the controller program 320. At this time, the MPU 240 resets the value of the counter 340 to zero according to the recovery program 330. The time required to perform the recovery process of the storage area of the controller program 320 may be varied with a size of the controller program 320, performance of the hardware such as the MPU 240, and the like. It generally takes a few minutes to perform the recovery process.

When the recovery process is completed, in Step S70, the MPU 240 restarts the main system 11 according to the recovery program 330. Then, the boot program 310 is executed again in Step S20. The controller program 320 is executed in Steps S40 to S50.

As described above, at the startup of the image forming apparatus 1, the recovery process of the storage area of the controller program 320 is performed if the read count of the controller program 320 reaches the threshold value.

(2) Operation to Switch from the Normal Status Mode to the Sleep Status Mode

<First Exemplary Operation>

Figure 5:
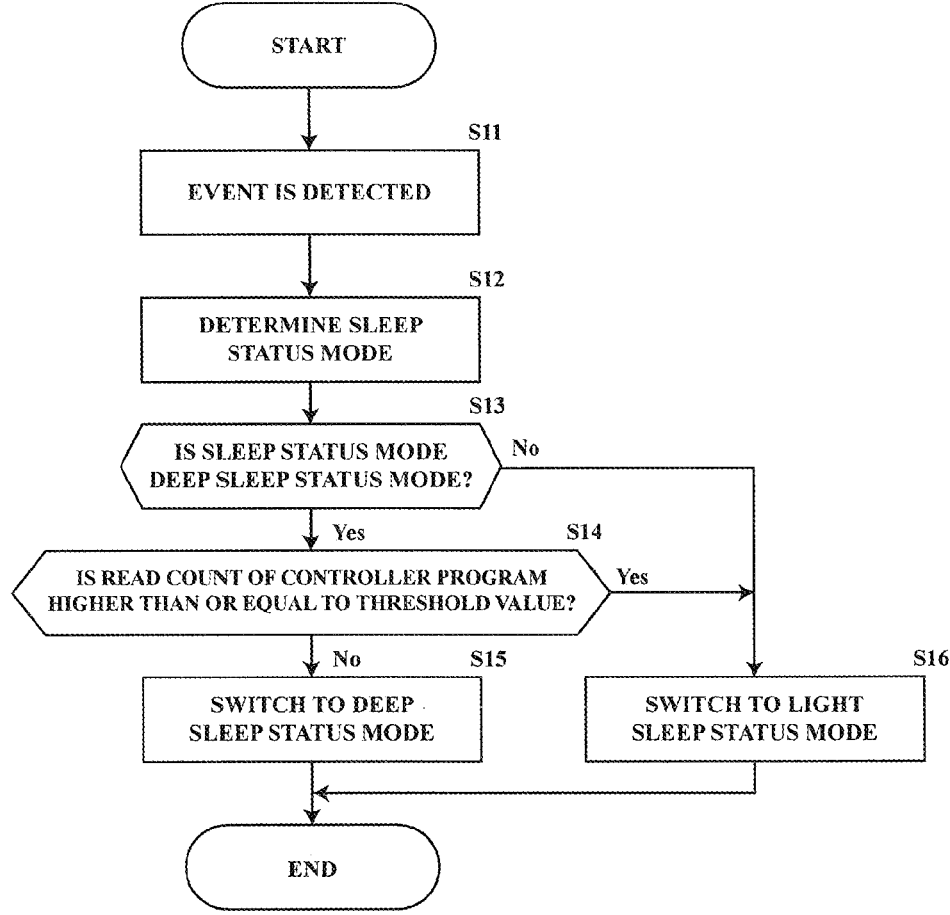
FIG. 5 shows a flowchart illustrating a first exemplary operation to switch from a normal status mode to some sleep status modes in the image forming apparatus.

FIG. 5 shows a flowchart illustrating a first exemplary operation to switch from the normal status mode to the sleep status mode in the image forming apparatus 1.

In Step S11, an event, such as elapse of a specified time period with no user's operation detected, reception of no job for a specified time period, pressing of a button to switch to a sleep status mode, and the like, is detected. In Step S12, the MPU 240 determines which sleep status mode is preferable on the basis of the detected events according to the controller program 320.

In Step S13, when the MPU 240 determines that the preferable sleep status mode is the deep sleep status mode (Yes in Step S13), in Step S14, the MPU 240 reads out the counter 340 according to the controller program 320 to determine whether the read count of the controller program 320 is higher than or equal to the threshold value. If the read count is not higher than or equal to the threshold value (No in Step S14), the MPU 240 transmits an instruction to switch to the deep sleep status mode to the energy saving subsystem 13. When the system control unit 32 in the energy saving subsystem 13 receives the instruction, the system control unit 32 turns off the main system 11 and the subsystems 12-1 to 12-N. In Step S15, the operation status mode is switched to the deep sleep status mode.

If the determined sleep status mode is the light sleep status mode (No in Step S13), or if the determined sleep status mode is the deep sleep status mode (Yes in Step S13) but the read count is higher than or equal to the threshold value (Yes in Step S14), the MPU 240 transmits an instruction to switch to the light sleep status mode to the energy saving subsystem 13 according to the controller program 320. When the system control unit 32 receives the instruction, the system control unit 32 turns off part or all of the subsystems 12-1 to 12-N. In Step S16, the operation status mode is switched to the light sleep status mode.

As described above, when the read count of the controller program 320 is higher than or equal to the threshold value, switching to the deep sleep status mode is inhibited even if the MPU 240 determines that the preferable sleep status mode is the deep sleep status mode, and the operation status mode is switched to the light sleep status mode.

<Second Exemplary Operation>

Figure 6:
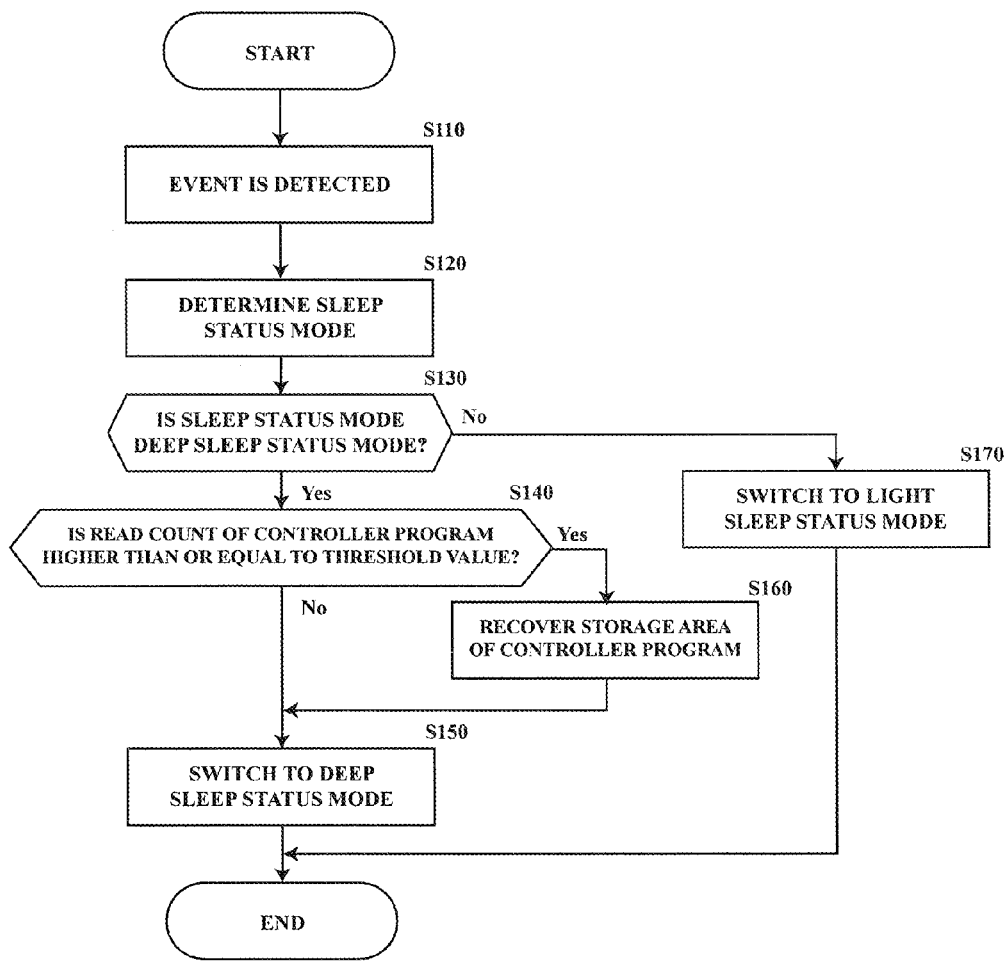
FIG. 6 shows a flowchart illustrating a second exemplary operation to switch from the normal status mode to the some sleep status modes in the image forming apparatus.

FIG. 6 shows a flowchart illustrating a second exemplary operation to switch from the normal status mode to the sleep status mode in the image forming apparatus 1.

In Step S110, the above-described event in the first exemplary operation is detected. In Step S120, the MPU 240 determines which sleep status mode is preferable on the basis of the detected events according to the controller program 320.

In Step S130, the MPU 240 determines whether the preferable sleep status mode is the deep sleep status mode. If the determined sleep status mode is the deep sleep status mode (Yes in Step S130), in Step S140, the MPU 240 reads out the counter 340 according to the controller program 320 to determine whether the read count of the controller program 320 is higher than or equal to the threshold value. If the read count is not higher than or equal to the threshold value (No in Step S140), the MPU 240 transmits the instruction to switch to the deep sleep status mode to the energy saving subsystem 13. When the energy saving system 13 receives the instruction, the system control unit 32 turns off the main system 11 and the subsystems 12-1 to 12-N. In Step S150, the operation status mode is switched to the deep sleep status mode.

If the determined sleep status mode is the deep sleep status mode (Yes in Step S130) but the read count is higher than or equal to the threshold value (Yes in Step S140), in Step S160, the MPU 240 in the main system 11 reads out the recovery program 330 and loads the read out recovery program 330 in the RAM 230 to execute the recovery program 330. This results in recovering the storage area of the controller program 320. At this time, the MPU 240 resets the value of the counter 340 to zero according to the recovery program 330. When the recovery process is completed, the MPU 240 transmits the instruction to switch to the deep sleep status mode to the energy saving subsystem 13 according to the controller program 320. When the system control unit 32 receives the instruction, the system control unit 32 in the energy saving subsystem 13 turns off the main system 11 and the subsystems 12-1 to 12-N. In Step S150, the operation status mode is switched to the deep sleep status mode.

If the determined sleep status mode is the light sleep status mode (No in Step S130), the MPU 240 transmits the instruction to switch to the light sleep status mode to the energy saving subsystem 13 according to the controller program 320. When the system control unit 32 receives the instruction, the system control unit 32 in the energy saving subsystem 13 turns off part or all of the subsystems 12-1 to 12-N. In Step S170, the operation status mode is switched to the light sleep status mode.

As described above, when the read count of the controller program 320 is higher than or equal to the threshold value, the recovery process is performed before switching to the deep sleep status mode if the MPU 240 determines that the preferable sleep status mode is the deep sleep status mode.

(3) Operation to Switch from the Sleep Status Mode to the Normal Status Mode

Figure 7:
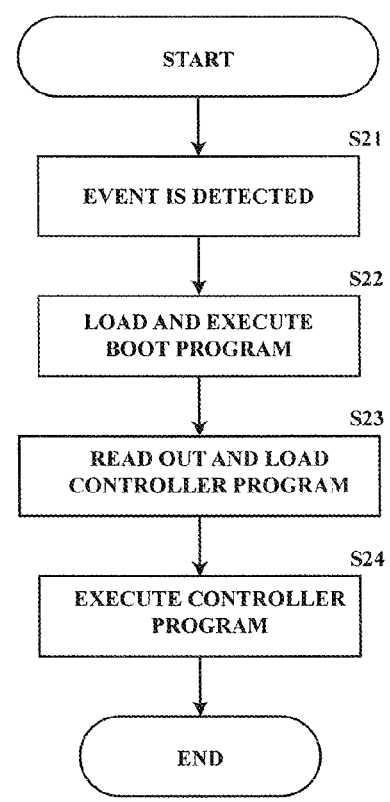
FIG. 7 shows a flowchart illustrating an exemplary operation to switch from a deep sleep status mode to the normal status mode in the image forming apparatus.

FIG. 7 shows a flowchart showing an exemplary operation to switch from the deep sleep status mode in the image forming apparatus 1.

In the case of the light sleep status mode, if the triggering event to recover from the sleep status mode is detected in the energy saving subsystem 13 or the main system 11, the system control unit 32 turns on the subsystem 12-$i$ that is turned off. This results in switching the operation status mode from the light sleep status mode to the normal status mode. At this time, the main system 11 executes the controller program 320 in the RAM 230 without reading out the controller program 320 from the non-volatile memory 220.

In the case of the deep sleep status mode, in Step S21, if the event as the trigger to recover from the sleep status mode is detected in the energy saving subsystem 13, the system control unit 32 turns on the main system 11 and the subsystems 12-1 to 12-N that are turned off. This results in switching the operation status mode from the deep sleep status mode to the normal status mode.

When supply of the power starts, in Step S22, the MPU 240 in the main system 11 loads the boot program 310 and executes the loaded boot program 310.

In Step S23, the MPU 240 reads out the controller program 320 from the non-volatile memory 220 according to the boot program 310 and loads the read out controller program 320 in the RAM 230. In Step S24, the MPU 240 executes the controller program 320. At this time, the MPU 240 increments the value of the counter 340 by one according to the controller program 320 or the boot program 310.

In switching from the sleep status mode to the normal status mode, the recovery process of the storage area of the controller program 320 is not performed.

According to the second embodiment, the main system 11 switches the operation status mode of the image forming apparatus 1 to the deep sleep status mode or the light sleep status mode. The main system 11 is turned off in the deep sleep status mode and the main system 11 remains turned on in the light sleep status mode. The main system 11 includes the non-volatile memory 220 that stores the controller program 320 and the MPU 240 that reads out the controller program 320 to execute the controller program 320. If the read count of the controller program 320 reaches the threshold value, the operation status mode of the image forming apparatus 1 is switched from the deep sleep status mode to the light sleep status mode according to the controller program 320.

Accordingly, even if switching to the deep sleep status mode is requested, by switching to the light sleep status mode in which reading out of the controller program is not required on switching to the normal status mode, the read disturb error occurring in the controller program 320 is avoided. As a result, the image forming apparatus 1 continues to operate successfully.

In addition, according to the second embodiment, the main system 11 inhibits switching to the deep sleep status mode until the image forming apparatus 1 is next started, and switches the operation status mode from the deep sleep status mode to the light sleep status mode if the read count of the controller program 320 reaches the threshold value. The recovery process of the storage area of the controller program 320 in the non-volatile memory 220 is performed when the image forming apparatus 1 is next started.

Accordingly, the recovery process of the storage area is performed only when the image forming apparatus 1 is started. A failure, such as deletion of the data that is received from an external apparatus (for example, the host apparatus 2 or an apparatus that transmits a facsimile signal), does not easily occur by the recovery process, even if timeout occurs in communication with the external apparatus or if it is necessary to restart the image forming apparatus 1 after the controller program 320 is recovered.

Furthermore, according to the second embodiment, if the read count of the controller program 320 from the non-volatile memory 220 reaches the threshold value, the main system 11 performs the recovery process of the storage area of the controller program 320 in the non-volatile memory 220 according to the controller program 320 before switching the operation status mode of the image forming apparatus 1 to the deep sleep status mode.

Accordingly, since the recovery process is performed before switching to the deep sleep status mode according to the read count of the controller program 320, read disturb errors occurring in the controller program 320 are avoided and the image forming apparatus 1 continues to operate successfully.

The present disclosure of the second embodiment includes various other embodiments. For example, other designs may be used in which the above-described components are each performed.

For example, the boot program 310 may be stored in the non-volatile memory 220. In this case, the recovery process of an area of the boot program 310 may be also performed in the recovery process of the storage area of the controller program 320.

In addition, the recovery program 330 may be stored in the ROM 210.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus comprising:
a communication interface configured to receive data;
a buffer configured to store the data received by the communication interface;
a main system configured to process the data stored in the buffer;
a subsystem configured to be controlled by the main system to perform a function of the image forming apparatus;
a system control unit configured to switch an operation status mode of the image forming apparatus between a normal status mode in which the main system and the subsystem are turned on, a deep sleep status mode in which the main system and the subsystem are turned off, and a light sleep status mode in which the main system is turned on and the subsystem is turned off; and
a data processing unit configured to, when the operation status mode is the deep sleep status mode, process the data received from the buffer if the data is determined to be processable by the data processing unit, and cause the system control unit to switch the operation status mode from the deep sleep status mode to the normal status mode if the data received from the buffer is determined not to be processable by the data processing unit,
wherein the main system includes a non-volatile memory that stores a controller program, and is configured to cause the system control unit to switch the operation status mode from the deep sleep status mode to the light sleep status mode according to the controller program if a read count of the controller program from the non-volatile memory reaches a threshold value,
wherein, if the read count reaches the threshold value, the main system is configured to cause the system control unit to inhibit switching of the operation status mode to the deep sleep status mode until the image forming apparatus next starts, cause the system control unit to switch the operation status mode from the deep sleep status mode to the light sleep status mode, and perform a recovery process of a storage area of the controller program in the non-volatile memory when the image forming apparatus next starts, and
wherein the threshold value is an upper limit of the read count at which a read disturb error does not occur in the non-volatile memory.

2. The image forming apparatus according to claim 1, further comprising:
a cache memory,
wherein the data processing unit is configured to store status data of the image forming apparatus in the cache memory when the system control unit switches the operation status mode from the normal status mode to the deep sleep status mode, and determine that the data is processable by the data processing unit if the data received from the buffer is processable on the basis of the status data.

3. The image forming apparatus according to claim 1, wherein the data that is determined to be processable by the data processing unit includes at least one of an Address Resolution Protocol (ARP) request, a Post Office Protocol version 3 (POP3) response, and a command to request the status of the image forming apparatus.

4. The image forming apparatus according to claim 1, wherein the data processing unit is configured to determine that the data received from the buffer is not processable by the data processing unit if operation of at least one of the main system and the subsystem and/or acquisition of status information from at least one of the main system and the subsystem are necessary for processing the received data.

5. The image forming apparatus according to claim 1, wherein the data determined not to be processable by the data processing unit includes at least one of print data, commands to read and/or write data stored in the subsystem, and a processing command for the subsystem.

6. The image forming apparatus according to claim 1, wherein the data processing unit is configured to decrease speed at which data is stored into the buffer from the communication interface when the system control unit switches the operation status mode from the deep sleep status mode to the normal status mode, and return the speed to original speed when switching of the operation status mode is completed.

7. The image forming apparatus according to claim 1, wherein the communication interface, the buffer, the system control unit, and the data processing unit are installed in a third hardware separated from a first hardware in which the main system is installed and a second hardware in which the subsystem is installed, and wherein the system control unit does not turn off the third hardware and turns off the first hardware and the second hardware when the operation status mode is switched from the normal status mode to the deep sleep status mode, and turns on the first hardware and the second hardware when the operation status mode is switched from the deep sleep status mode to the normal status mode.

8. An image forming method comprising:
via a communication interface, receiving data;
via a buffer, storing the data received by the communication interface;
via a main system, processing the data stored in the buffer;
via a subsystem, performing a function of an image forming apparatus by being controlled by the main system;
via a system control unit, switching an operation status mode of the image forming apparatus between a normal status mode in which the main system and the subsystem are turned on, a deep sleep status mode in which the main system and the subsystem are turned off, and a light sleep status mode in which the main system is turned on and the subsystem is turned off;
via a data processing unit, when the operation status mode is the deep sleep status mode, processing data received from the buffer if the data is determined to be processable by the data processing unit, and causing the system control unit to switch the operation status mode from the deep sleep status mode to the normal status mode if the data received from the buffer is determined not to be processable by the data processing unit;
via the main system, causing the system control unit to switch the operation status mode from the deep sleep status mode to the light sleep status mode according to a controller program stored in a non-volatile memory of the main system if a read count of the controller program from the non-volatile memory reaches a threshold value; and
via the main system, if the read count reaches the threshold value, causing the system control unit to inhibit switching of the operation status mode to the deep sleep status mode before the image forming apparatus next starts, causing the system control unit to switch the operation status mode from the deep sleep status mode to the light sleep status mode, and performing a recovery process of a storage area of the controller program in the non-volatile memory when the image forming apparatus next starts;
wherein the threshold value is an upper limit of the read count at which a read disturb error does not occur in the non-volatile memory.

9. The image forming method according to claim 8, further comprising:
decreasing a speed at which data is stored into the buffer from the communication interface when the system control unit switches the operation status mode from the deep sleep status mode to the normal status mode, and returning the speed to original speed when switching of the operation status mode is completed.

10. An image forming apparatus comprising:
a communication interface configured to receive data;
a buffer configured to store the data received by the communication interface;
a main system configured to process the data stored in the buffer;
a subsystem configured to be controlled by the main system to perform a function of the image forming apparatus;
a system control unit configured to switch an operation status mode of the image forming apparatus between a normal status mode in which the main system and the subsystem are turned on, a deep sleep status mode in which the main system and the subsystem are turned off, and a light sleep status mode in which the main system is turned on and the subsystem is turned off; and
a data processing unit configured to, when the operation status mode is the deep sleep status mode, process the data received from the buffer if the data is determined to be processable by the data processing unit, and cause the system control unit to switch the operation status mode from the deep sleep status mode to the normal status mode if the data received from the buffer is determined not to be processable by the data processing unit,
wherein the main system includes a non-volatile memory that stores a controller program, and is configured to perform a recovery process of a storage area of the controller program in the non-volatile memory before causing the system control unit to switch the operation status mode to the deep sleep status mode according to the controller program if a read count of the controller program is from the non-volatile memory reaches a threshold value,
wherein the main system is configured to perform the recovery process before the operation status mode is switched to the deep sleep status mode if the operation status mode is switched to the deep sleep status mode before the image forming apparatus next starts, and perform the recovery process when the image forming apparatus next starts if the operation status mode is not switched to the deep sleep status mode before the image forming apparatus next starts,
wherein the threshold value is an upper limit of the read count at which a read disturb error does not occur in the non-volatile memory.

11. An image forming method comprising:
via a communication interface, receiving data;
via a buffer, storing the data received by the communication interface;
via a main system, processing the data stored in the buffer;
via a subsystem, performing a function of an image forming apparatus by being controlled by the main system;
via a system control unit, switching an operation status mode of the image forming apparatus between a normal status mode in which the main system and the subsystem are turned on, a deep sleep status mode in which the main system and the subsystem are turned off, and a light sleep status mode in which the main system is turned on and the subsystem is turned off;
via a data processing unit, when the operation status mode is the deep sleep status mode, process the data received from the buffer if the data is determined to be processable by the data processing unit, and cause the system control unit to switch the operation status mode from the deep sleep status mode to the normal status mode if the data received from the buffer is determined not to be processable by the data processing unit;

via the main system, performing a recovery process of a storage area of a controller program stored in a non-volatile memory of the main system before causing the system control unit to switch the operation status mode to the deep sleep status mode according to the controller program if a read count of the controller program from the non-volatile memory reaches a threshold value, and via the main system, performing the recovery process before the operation status mode is switched to the deep sleep status mode if the operation status mode is switched to the deep sleep status mode before the image forming apparatus next starts, and performing the recovery process when the image forming apparatus next starts if the operation status mode is not switched to the deep sleep status mode before the image forming apparatus next starts, wherein the threshold value is an upper limit of the read count at which a read disturb error does not occur in the non-volatile memory.

* * * * *